US009431701B1

(12) United States Patent
Chaudhary et al.

(10) Patent No.: US 9,431,701 B1
(45) Date of Patent: Aug. 30, 2016

(54) DUAL ANTENNA TRANSFER SWITCH SYSTEM, METHOD AND APPARATUS

(71) Applicant: MTN Satellite Communications, Seattle, WA (US)

(72) Inventors: Hassan Waqar Azeem Chaudhary, Pembroke Pines, FL (US); Claudio Pallais, Miami, FL (US); Bernardo Ferro, Miami, FL (US); Richard A Hadsall, Sr., Miami, FL (US); Zafar Khan, Miami, FL (US)

(73) Assignee: EMC SatCom Technologies LLC, Miramar, FL (US)

( * ) Notice: Subject to any disclaimer, the term of this patent is extended or adjusted under 35 U.S.C. 154(b) by 308 days.

(21) Appl. No.: 14/273,429

(22) Filed: May 8, 2014

Related U.S. Application Data

(63) Continuation of application No. 13/245,691, filed on Sep. 26, 2011, now Pat. No. 8,730,103.

(51) Int. Cl.
*H04B 7/185* (2006.01)
*H01Q 3/12* (2006.01)

(52) U.S. Cl.
CPC .................................... *H01Q 3/12* (2013.01)

(58) Field of Classification Search
CPC ........... H04B 7/185; H01Q 3/12; H01Q 3/29
USPC .................................................. 342/352, 368
See application file for complete search history.

(56) References Cited

U.S. PATENT DOCUMENTS 5,912,641 A * 6/1999 Dietrich ............. H04B 7/18536 342/353
6,157,896 A * 12/2000 Castles ................... G01S 19/14 342/357.68
2004/0210389 A1* 10/2004 Zimmerman ........ G01C 21/165 701/470
2010/0060517 A1* 3/2010 Nichols .............. H01Q 21/0025 342/357.29

* cited by examiner

*Primary Examiner* — Harry Liu
(74) *Attorney, Agent, or Firm* — FSP LLC

(57) ABSTRACT

A system, methods, and apparatus for dual antenna transfer switching are disclosed. In an example embodiment, a dual antenna system includes antennas, antenna control units, a transfer switch, and a modem. For example, the transfer switch may transfer a connection between antennas based on changing satellite visibility, upon entering a preprogrammed blockage zone or an unexpected loss of satellite visibility. The transfer switch may receive GPS data from an external GPS unit and/or the antenna control units and buffer the GPS data to a modem. The transfer switch may provide a modem receive-lock signal to retarget a line of sight. The transfer switch may transfer the connection between the antennas based on satellite visibility including signal reception quality and/or a modem receive-lock status. The transfer switch may, based on a difference in antenna uplink transmission power, attenuate a higher power antenna to be balanced with a lower power antenna.

13 Claims, 4 Drawing Sheets

DUAL ANTENNA TRANSFER SWITCH SYSTEM, METHOD AND APPARATUS

This application claims priority and benefit as a continuation of U.S. application Ser. No. 13/245,691, filed on Sep. 26, 2011.

BACKGROUND

Wireless communication systems, such as very small aperture terminal ("VSAT") systems typically include one or more antennas at each ground terminal. Typically, dual antenna systems are employed for moving vessels, vehicles, or crafts that require a capability for continuous communication, which requires a continuous line of sight to a satellite, hub, or other communication terminal or node. For example, commercial ships may use a dual VSAT system for receiving an internet connection, telephone connections, television broadcast, etc. A dual VSAT system includes two steerable antennas, which compliment each other by switching the communication connection between the two antennas when one antenna is in a blockage zone where the antenna does not have satellite visibility. The antennas may enter a blockage zone caused by, for example, a mast on the ship which impedes satellite visibility. When one antenna is entering a blockage zone, the communication connection may be switched to the other antenna. The antennas are generally placed on a ship so that both antennas are not simultaneously in a blockage zone caused by shipboard structures or equipment. However, situations causing an antenna to unexpectedly lose satellite visibility remain a problem. For example, any type of signal interference or noise, blockages from other ships, cranes, mountains, weather conditions, antenna drift, and/or various equipment problems may cause communication failures or interruptions. Any unexpected signal degradation may be problematic. Accordingly, the dual antenna communications systems of the prior art may be improved as presently disclosed.

SUMMARY

The present disclosure provides a new and innovative system, methods, and apparatus for dual antenna transfer switching. In an example embodiment, a dual antenna system includes antennas, antenna control units, a transfer switch, and one or two modems. For example, the transfer switch may transfer a connection from one antenna to the other based on a change in satellite visibility due to entering a preprogrammed blockage zone or an unexpected loss of satellite visibility. The transfer switch may receive GPS data from an external GPS unit and/or the antenna control units and buffer the GPS data to the one or two modems. The transfer switch may provide a modem receive-lock signal to retarget a line of sight in response to an antenna drift. The transfer switch may transfer the connection between the antennas based on a satellite visibility value based on signal reception quality and/or a modem receive-lock status. The transfer switch may determine the uplink transmission power levels of the antennas and set an attenuation level for one of the antennas based on a difference in the uplink transmission power levels by attenuating the higher power antenna to be balanced with the lower power antenna.

Additional features and advantages of the disclosed system, methods, and apparatus are described in, and will be apparent from, the following Detailed Description and the Figures.

DETAILED DESCRIPTION OF EXAMPLE EMBODIMENTS

The present disclosure relates in general to a wireless communications system, and in particular, a system for dual antenna transfer switching. Briefly, in an example embodiment, a dual antenna system is provided with a transfer switch that provides improved switching of a communication connection between the antennas. For example a transfer switch may transfer a connection based on reception quality or modem receive-lock status. For example, the transfer switch may provide for a modem receive-lock signal to retarget a line of sight based on antenna drift. For example, the transfer switch may power balance the uplink transmission power levels of the antennas. For example, the transfer switch may buffer GPS data from an external GPS unit to a modem. For example, the transfer switch may optimally determine whether to transfer or maintain a connection when both antennas are experiencing a loss of satellite visibility. For example a transfer switch may transfer a connection based on an in network or out of network status. Further, for example, a solid state transfer switch may seamlessly perform a connection transfer very quickly, for example, in twenty nanoseconds.

Accordingly, the presently disclosed transfer switch may provide for seamless connection transfers, improved reception quality, reduced transmission uplink errors, saving transmission power, and decreased modem downtime. In a non-limiting example embodiment, certain features disclosed in the present patent application may be commercially embodied in the Transfer Switch 3000, and/or other products and services as offered by MTN Satellite Communications, the assignee of the present application.

Figure 1:
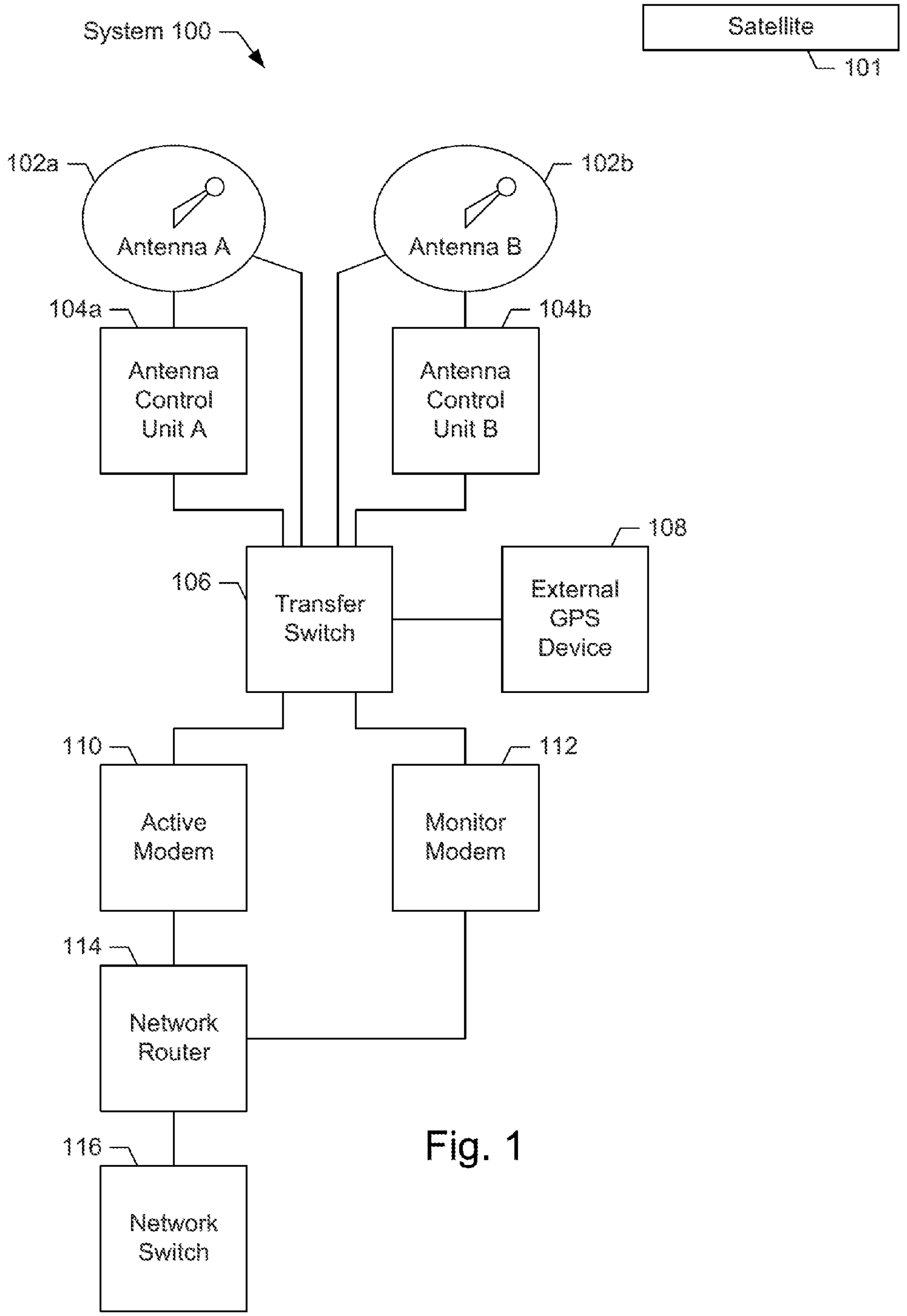
FIG. 1 is a high level block diagram of an example dual antenna communications system, according to an example embodiment of the present invention.

The present system may be readily realized in a dual antenna communications system 100. A high level block diagram of an example dual antenna communications system 100 is illustrated in FIG. 1. The illustrated system 100 includes two antennas 102*a* and 102*b*, each having an associated antenna control unit 104*a* and 104*b*, respectively. The antennas 102*a*, 102*b* may transmit and receive signals to and from a satellite 101. A transfer switch 106 is operatively coupled with the antennas 102*a*, 102*b* and the antenna control units 104*a*, 104*b*. An external GPS device 108 may be coupled to the transfer switch 106. The transfer switch is coupled to an active modem 110. The transfer switch may also be coupled to a monitor modem 112. The active modem 110 and monitor modem 112 may be coupled to a network router 114, which may in turn be coupled to a network switch 116. In an example embodiment, the system 100 is a VSAT system. The system 100 may be located, for example, on a commercial ship, a luxury yacht, an aircraft, a hovercraft, an oil platform, or the like. In an example embodiment, the satellite 101 may be a geosynchronous satellite or a geostationary satellite.

For example, the system 100 may be located on a cruise ship, which needs to maintain television, telephone, and internet connections for its guests. The antennas 102*a*, 102*b* may be located towards opposite sides of the ship, so that shipboard structures and equipment which may create a blockage for antenna 102*a* will not create a blockage for antenna 102*b*. As the ship moves and/or as the satellite 101 moves, the antennas 102*a*, 102*b* track the location of the satellite 101 to maintain satellite visibility. If the antenna 102*a* begins to drift off the proper line of sight, communication will eventually be lost after a certain degree of drift occurs. Accordingly, the antenna control units 104*a*, 104*b* may maintain the antennas 102*a*, 102*b* line of sight with the satellite 101. It should be appreciated that the process of satellite tracking as performed by antenna control units 104*a*, 104*b* and antennas 102*a*, 102*b* is well known in the art. Further, antenna control units 104*a*, 104*b* may be programmed to identify blockage zones which the antenna 102*a*, 102*b* will enter as the antenna 102*a*, 102*b* moves to track a satellite 101. As discussed above, known blockage zones are typically caused by known structures or equipment which may enter the line of sight of the antenna 102*a*, 102*b*. For example, a blockage zone may typically be ten or twenty degrees wide in azimuth. When the antenna 102*a* is approaching a preprogrammed blockage zone, the antenna control unit 102*a* may send a signal to the transfer switch 106 to transfer a communication connection with the satellite 101 to the other antenna 102*b*.

It should be appreciated that an antenna 102*a*, 102*b* often includes an internal GPS unit, which provides GPS data to the ACU, which may format the data for use by the active modem 110, and the monitor modem 112. Accordingly, an external GPS device 108 may not be required in many cases, however, when an antenna 102*a*, 102*b* is not providing GPS data, an external GPS feed may be required by the active modem 110 and the monitor modem 112 to maintain communication with the satellite 101. Accordingly, the transfer switch 106 may be configurable to allow for the external GPS device 108, as either the sole source of GPS data, as a backup source of GPS data, or the like. For example, an antenna 102*a*, 102*b* that has an internal GPS unit may experience a failure, in which case, a backup external GPS device 108 may be put into use, or may be installed as a quick remedy without replacing or repairing the antenna 102*a*, 102*b*.

The active modem 110 passes a primary connection, with substantive data being passed between the satellite 101 and the network router 114, such as a television broadcast, radio broadcast, internet connection, or the like between. For example, antenna 102*a* may be the default antenna to receive the primary connection. The primary connection is processed by active modem 110, which passes the data connection between the satellite 101 and network router 114. The primary connection is also used to determine satellite visibility, for example, by measuring downlink reception quality as seen by the active modem 112 and/or ensuring modem receive-lock.

The system 100 may always pass the primary connection through the active modem 110, while the monitor modem 112 only has a secondary connection. For example, the monitor modem 112 may be receiving the same downlink data signals as the active modem 110, to allow for measurement of reception quality and ensure modem receive-lock, and may provide data accordingly to the transfer switch 106 and antenna control unit 104*b*. However, antenna 102*b* may only be transmitting limited data to maintain the connection, such as keep-alive signals. The transfer switch 106 may compare the satellite visibility of the antenna 102*a* to predefined thresholds and/or to the satellite visibility of the other antenna 102*b*. For example, if the satellite visibility of antenna 102*a* has diminished, then the transfer switch may automatically and seamlessly transfer the primary connection to the other antenna 102*b*. Similarly, for example, an antenna 102*a* may lose modem receive-lock if the antenna 102*a* drifts from the proper line of sight and the antenna 102*a* starts receiving a nearby satellite 101 with a higher transmission power on the same frequency. The active modem 110 or the monitor modem 112 may determine, for example, that the data received by antenna 102*a* is not from the proper satellite 101, and may trigger an interrupt changing the modem receive-lock status. Accordingly, the antenna control unit 102*a* may receive this indication (e.g., via a binary interrupt line), and then retarget the antenna 102*a* to track the proper satellite 101. If the antenna 102*a* had the primary connection, the transfer switch 106 may transfer the connection to the other antenna 102*b* while the retargeting occurs so the connection is seamlessly maintained for the user. Accordingly, users of the connection, for example, watching a television program, surfing the internet, etc., do not have any interruption in the connection.

Accordingly, the primary connection may be maintained through either antenna 102*a*, 102*b*, when the satellite visibility is good. However, when satellite visibility decreases or some other problem with one of the two antenna connections occurs, the transfer switch may transfer the connection which is passed through to the network router 114, and to the network switch 116. The network switch 116 may then communicate the data connection with any suitable network (e.g., a local area network on a ship). It should be appreciated that the monitor modem 112 may communicate with the network router 114 and/or the network switch similarly to the active modem, even though monitor modem is not providing a substantive data connection (e.g., keep alive messages, networking data, addressing data).

It should be appreciated that the data communicated through the system 100 may be performed in many different ways, for example, using different carrier frequencies, different modulation schemes, etc. For example, baseband data is transmitted to and from the modem, which may be modulated using an intermediate frequency (e.g., 70 MHz, 140 MHz), which may be modulated to the radio frequency used for transmission between the antenna 102*a*, 102*b* and the satellite 101 (e.g., a range of 3 to 30 GHz, the $K_u$ band, the band, the $K_a$ band, or the X band).

In an example embodiment, the active modem 110 and monitor modem 112 may employ quadrature phase shift keying ("QPSK") modulation. In an example embodiment, the active modem 110 and monitor modem 112 may employ time division multiple access ("TDMA") for uplink transmit and single channel per carrier ("SCPC") for downlink receive. In an example embodiment, spread spectrum and/or frequency hopping is used. Also, in an example embodiment, the system 100 only includes the active modem 110 and not the monitor modem 112. In this set up, the antenna 102*a*, 102*b* which the primary connection is not being transmitted and received on may not be able to provide any satellite visibility value, signal reception quality, modem receive-lock status, etc., because the monitor modem 112 cannot measure or determine such information. In this case, the status of satellite that is providing the primary connection may simply be analyzed against an expect status of the other satellite. Accordingly, for example, if a connection transfer occurs from antenna 102*a* to 102*b*, and the satellite visibility value of antenna 102*b* is lower than the antenna 102*a* which was previously being used, the connection may be transferred back to the original antenna 102*a*.

Figure 2:
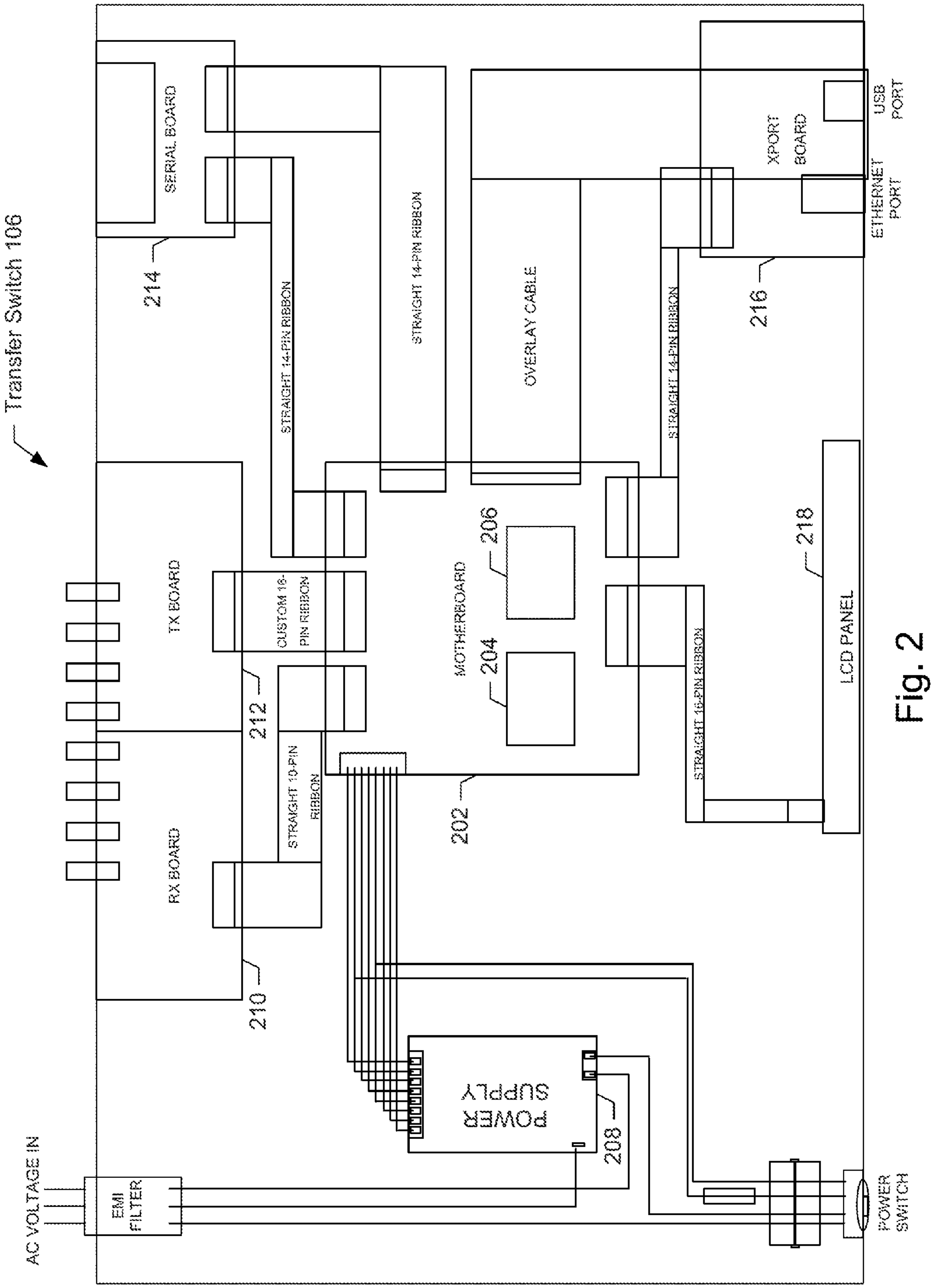
FIG. 2 is a detailed block diagram of an example transfer switch, according to an example embodiment of the present invention.

A detailed block diagram of an example transfer switch 106 is illustrated in FIG. 2. In this example embodiment, a motherboard 202 may include one or more processors 204 operationally coupled to one or more memory devices 206, and one or more interface circuits. For example, the motherboard may be linked to a power supply 208, Rx board 210, Tx board 212, serial board 214, XPort® board 216, and LCD panel 218. The processor 204 may be any suitable processor, such as the Microchip PIC32® microcontroller or a microprocessor from the INTEL PENTIUM® family of microprocessors. Also, for example, an Atmel® processor or an ARM® processor may be similarly employed. In an example embodiment, the motherboard 202 and one or more processors 204 are all solid state devices. The memory 206 preferably includes volatile memory and non-volatile memory. Preferably, the memory 206 stores a software program that interacts with the other devices in the system 100 as described below. This program may be executed by the processor 204 in any suitable manner. The transfer switch 106 is illustrated with various connections from the motherboard 202 to the power supply 208, Rx board 210, Tx board 212, serial board 214, XPort® board 216, and LCD panel 218. It should be appreciated that these connection types are merely for purposes of example, and that the transfer switch 106 may include a wide variety of different designs, components, layouts, etc.

The Rx board 210 and the Tx board 212 couple the transfer switch 106, for example, to antennas 102*a*, 102*b*, the active modem 110, and the monitor modem 112, to transmit and receive the communication signals. In an example embodiment, the Rx board 210 and the Tx board 212 may be manufactured by Honeywell, although it should be appreciated that other suitable devices may be used. For example, the Rx board 210 and the Tx board 212 may be rated for 75 ohms and capable of passing a signal ranging approximately from DC to 2.5 GHz. The transfer switch may maintain a primary communication connection with the satellite 101 (e.g., internet connection through antenna 102*a*) to the active modem 110, while maintaining a secondary connection (e.g., keep-alive signals through antenna 102*b*) with monitor modem 112. In an example embodiment, the Rx board 210 and the Tx board 212 may have coaxial cable couplings, or any other suitable coupling for transmitting and receiving data to and from the antennas 102*a*, 102*b*, the active modem 110, and the monitor modem 112 (e.g., a C band RF signal).

The serial board 214 may couple the transfer switch 106, for example, to antenna control units 104*a*, 104*b*, an external GPS unit 108, the active modem 110, and the monitor modem 112. For example, GPS data, blockage zone data, etc. may be provided from the antenna control units 104*a*, 104*b* to the transfer switch 106. The transfer switch 106 may in turn, buffer the GPS data, from the antenna control units 104*a*, 104*b* and/or the external GPS unit 108, to the active modem 110 and the monitor modem 112. In an example embodiment, the serial board 214 may have RJ-45 couplings, or any other suitable coupling for transmitting and receiving data to and from the antenna control units 104*a*, 104*b* and/or the external GPS unit 108.

The XPort® board 216 may include, for example, an Ethernet port and/or a USB port. In an example embodiment, the XPort® board 216 may be provided by LANTRONIX®, however, it should be appreciated that various suitable alternatives may be provided. The XPort® board 216 may allow for remote access of the transfer switch 106. As discussed below, a user may set up the transfer switch 106 locally or remotely, as well as receive status information and the like. A display such as an LCD panel 218 with a keypad may also be connected to the motherboard 202 for local user set up. For example, the LCD panel 218 may provide a user interface, which will be described in further detail below. A user interface may include prompts for human input from a user for selecting different settings, setting various thresholds, etc. The LCD panel 218 may provide various outputs in response to the user inputs and provide status information, such as the antenna connection status, reception quality, reception power, transmission power, modem receive-lock status, network status, GPS status, modem status, input confirmations, warnings, etc. Access to a switching device 106 can be controlled by appropriate security software or security measures. For example, access to the LCD panel 218 or a remote interface can be limited to users with a login and password, or the like.

Figure 3:
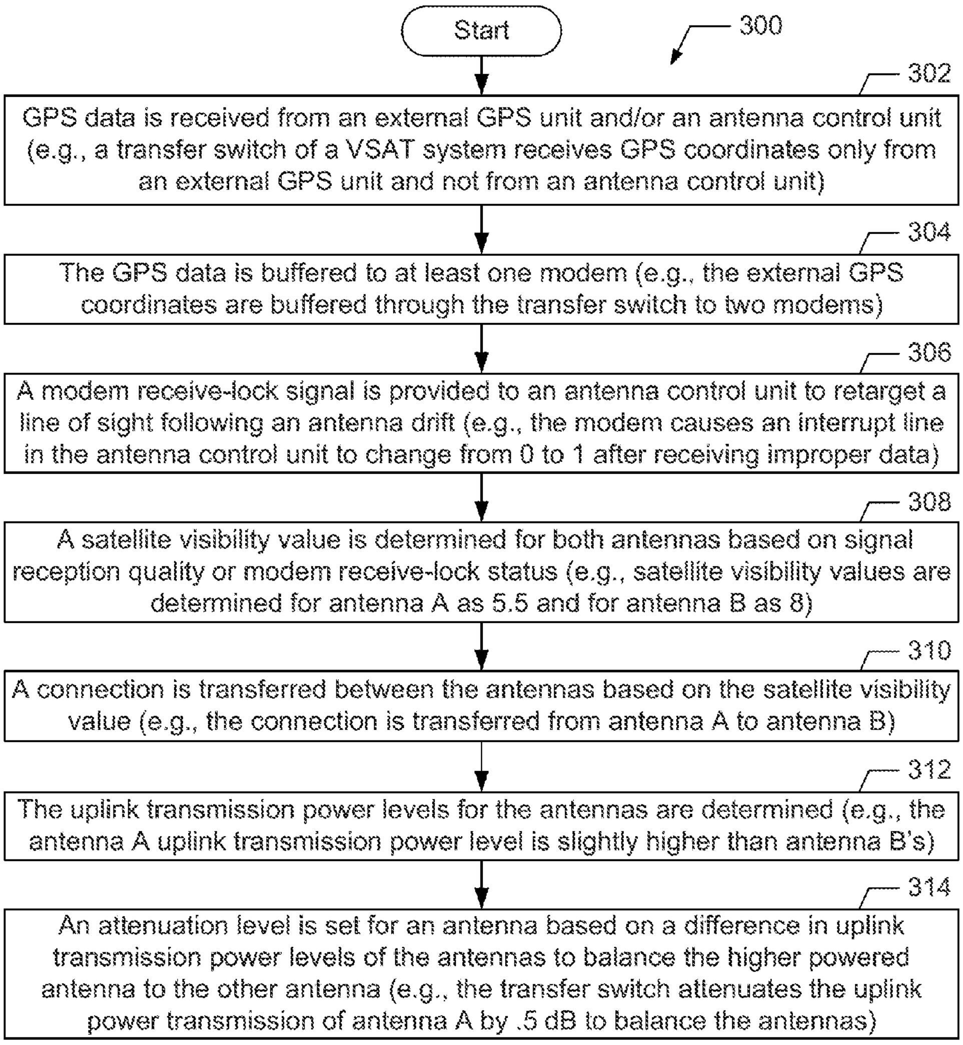
FIG. 3 includes a flowchart illustrating an example process for dual antenna transfer switching, according to an example embodiment of the present invention.

FIG. 3 is a flowchart of an example process 300 for dual antenna transfer switching. Although the process 300 is described with reference to the flowchart illustrated in FIG. 3, it will be appreciated that many other methods of performing the acts associated with the process 300 may be used. For example, the order of many of the blocks may be changed, many blocks may be intermittently repeated or continually performed, certain blocks may be combined with other blocks, and many of the blocks described are optional or may only be contingently performed.

The example process 300 may begin when GPS data is received from an external GPS unit and/or an antenna control unit (block 302). For example, a transfer switch of a VSAT system receives GPS coordinates only from an external GPS unit and not from an antenna control unit. The GPS data is buffered to at least one modem (block 304). For example, the external GPS coordinates are buffered through the transfer switch to two modems. In an example embodiment, the transfer switch 106 does not truncate the GPS data, so the GPS location data may be very accurate and precise. In an example embodiment, only GPS data from an external GPS device is used. In an example embodiment, only GPS data from the antennas through the antenna control units is used. In an example embodiment, GPS data from an external GPS device and GPS data from the antennas through the antenna control units are used.

The example process 300 may continue as a modem receive-lock signal is provided to an antenna control unit to retarget a line of sight following an antenna drift (block 306). For example, the modem causes an interrupt line in the antenna control unit to change from 0 to 1 after receiving improper data. For example, the modem may determine that the data is in an incorrect format, indicating the antenna has drifted and locked on to the wrong satellite. Even a slight antenna drift may cause loss of modem receive-lock. Also, it should be appreciated that modem receive-lock may be lost or not provided for a variety of other reasons, for example, such as improper unbalanced uplink transmission power level when transferring from one antenna to another.

Further, a satellite visibility value is determined for both antennas based on signal reception quality or modem receive-lock status (block 308). For example, satellite visibility values are determined for antenna A as 5.5 and for antenna B as 8. A satellite visibility value may be determined, for example, based on reception quality, modem receive-lock status, transmission power, and/or reception power. In an example embodiment, the satellite visibility values may be measured in decibels. Reception quality of data received at a modem 110, 112 can be measured in a variety of ways. For example, signal to noise ratio ("SNR"), carrier to noise ratio ("C/N"), carrier to noise density, and/or latency may measure reception quality. Accordingly, reception quality may be measured in decibels, bits, milliseconds, etc. It should be appreciated that different performance indicators may be used for different systems, modulation techniques, etc. For example, a C/N value may be more useful than an SNR value for determining a reception quality for a particular VSAT system.

A connection is transferred between the antennas based on the satellite visibility value (block 310). For example, the connection is transferred from antenna A to antenna B. The transfer switch may compare the determined satellite visibility value of an antenna to a threshold value, and/or may compare the determined satellite visibility value of the antennas to each other. For example, if a satellite visibility value is in dB, a user may set a threshold (e.g., 12 dB) above which the connection need not be changed, even if the satellite visibility of the other antenna is higher. If the antenna providing the primary connection has a satellite visibility value below the threshold, the differential between the antennas is determined, and if large enough (e.g., 5 dB), the transfer switch may transfer the connection. Accordingly, for example, a user may set threshold and difference triggers using a remote interface at a threshold of 7 dB and difference threshold of greater than 2 dB. It should be appreciated that the threshold and difference triggers may be set so as to not cause more switching than necessary.

The example process 300 may include the uplink transmission power levels for the antennas being determined (block 312). For example, the antenna A uplink transmission power level is slightly higher than antenna B's. Accordingly, an attenuation level is set for an antenna based on a difference in uplink transmission power levels of the antennas to balance the higher powered antenna to the other antenna (block 314). For example, the transfer switch attenuates the uplink power transmission of antenna A by 0.5 dB to balance the antennas. It should be appreciated that unbalanced uplink transmission power from the antennas may cause problems for the satellite receiving the uplink transmission during a transmission from one antenna to the other antenna. Typically, antennas may be very well balanced and not need any attenuation. However, for example, if one antenna is replaced so that the two antennas include one old antenna and one new antenna, even of the same exact model, the uplink transmission power levels may be different. For example, switching from an old antenna to a new antenna when entering a preprogrammed blockage zone may cause an error at the satellite if the new antenna has a hotter signal, or a higher uplink transmission power.

Figure 4:
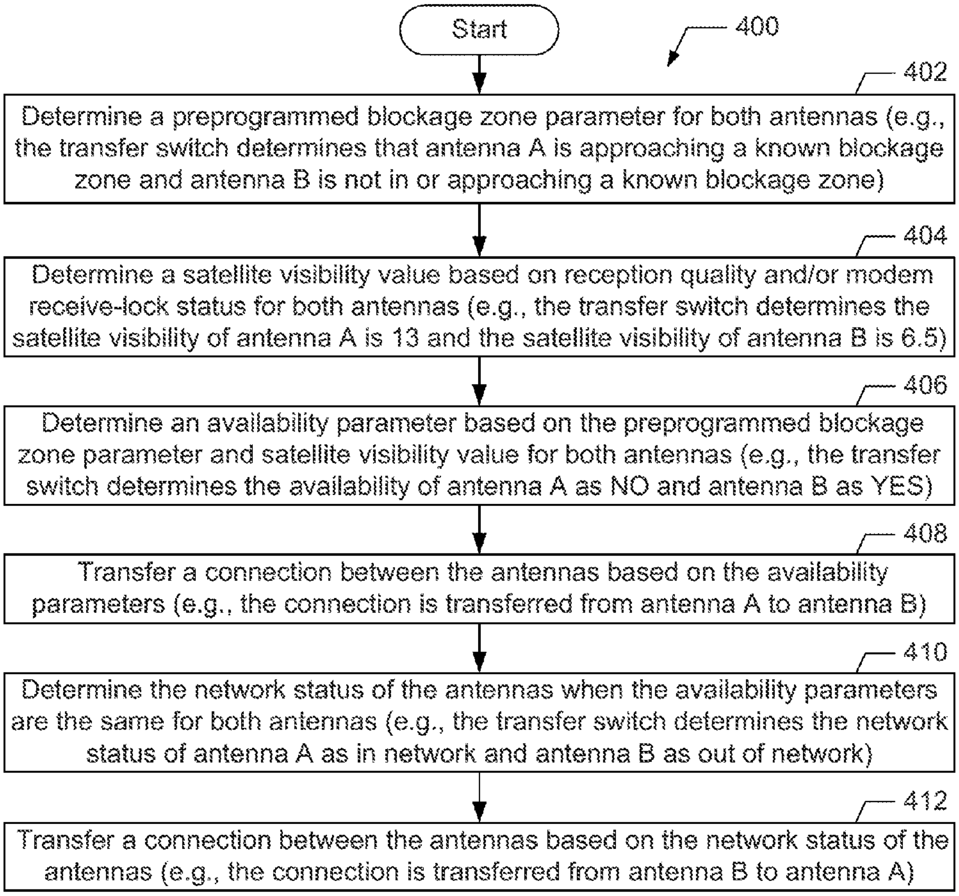
FIG. 4 includes a flowchart illustrating an example process for dual antenna transfer switching, according to an example embodiment of the present invention.

FIG. 4 is a flowchart of an example process 400 for dual antenna transfer switching. Although the process 400 is described with reference to the flowchart illustrated in FIG. 4, it will be appreciated that many other methods of performing the acts associated with the process 400 may be used. For example, the order of many of the blocks may be changed, many blocks may be intermittently repeated or continually performed, certain blocks may be combined with other blocks, and many of the blocks described are optional or may only be contingently performed.

The example process 400 may begin with determining a preprogrammed blockage zone parameter for both antennas (block 402). For example, the transfer switch determines that antenna A is approaching a known blockage zone and antenna B is not in or approaching a known blockage zone. Also, determine a satellite visibility value based on reception quality and/or modem receive-lock status for both antennas (block 404). For example, the transfer switch determines the satellite visibility of antenna A is 13 and the satellite visibility of antenna B is 6.5. Next, determine an availability parameter based on the preprogrammed blockage zone parameter and satellite visibility value for both antennas (block 406). For example, the transfer switch determines the availability of antenna A as NO and antenna B as YES. Even though antenna A may have better satellite visibility, because it is entering a blockage zone, it is determined to be unavailable. Then, transfer a connection between the antennas based on the availability parameters (block 408). For example, the connection is transferred from antenna A to antenna B. Also, in an example embodiment, when the availability parameter of both antennas is unavailable, the connection may be transferred from an antenna in a blockage zone to an antenna outside of a blockage zone. Accordingly, if the satellite visibility improves, the satellite which is not in a known blockage zone has the connection. Similarly, when the availability parameter of the antennas is either both unavailable or both available, the connection may be maintained with the current antenna.

Also, the example process 400 may include determining the network status of the antennas when the availability parameters are the same for both antennas (block 410). For example, after antenna A exits the preprogrammed blockage zone so both antennas are available, the transfer switch determines the network status of antenna A as in network and antenna B as out of network. For example, even if antenna B has high satellite visibility, good signal reception, modem receive-lock, and/or adequate reception power the satellite may not be able to properly receive the uplink transmission data. For example, if the antenna has a problem (e.g., physical fault such as bent or broken wire, disabled amplifier, insufficient buck converter), the satellite may provide a status of out of network. In this case, the connection may be transferred between the antennas based on the network status of the antennas (block 412). For example, the connection is transferred from antenna B to antenna A. Accordingly, even if the satellite visibility of antenna B is better than antenna A, if for example, the buck converter for antenna B is rated at a lower power than antenna A's buck converter. It should be appreciated that such a problem may arise in a case where a storm or other interference is causing a higher than normal level of power from the buck converter to be needed to establish an in network connection with the satellite. Also, in an example embodiment, when both antennas have a status of out of network, the connection may be transferred to an antenna that is not in a known blockage zone.

For exemplary purposes, the present disclosure discusses a various examples relating to a VSAT antenna system. However, it should be appreciated that the disclosed system, methods, and apparatus may be advantageously used in any antenna system employing at least two steerable antennas. For example, a terrestrial communication system using microwave point to point links may employ a system of steerable antennas using a transfer switch as described within the present disclosure. In an example embodiment, any mobile or immobile vehicle, vessel, craft, or platform may include a dual antenna system as presently disclosed.

It will be appreciated that all of the disclosed methods and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. Also, it should be appreciated that the features of the dependent claims may be embodied in the systems, methods, and apparatus of each of the independent claims.

The invention is claimed as follows:

1. A system comprising:

a first steerable antenna;

a first antenna control unit operably coupled to the first steerable antenna;

a second steerable antenna;

a second antenna control unit operably coupled to the second steerable antenna, wherein the first steerable antenna is configured to provide a data connection at a first point in time;

a transfer switch operably coupled to the first antenna control unit, the first steerable antenna, the second antenna control unit, and the second steerable antenna, the transfer switch configured to transfer the data connection from the first steerable antenna to the second steerable antenna at a second point in time, in response to a change in satellite visibility based on the first steerable antenna at least one of (i) entering a preprogrammed blockage zone and (ii) an unexpected loss of satellite visibility; and at least one modem operably coupled to the transfer switch for transmitting and receiving data with a satellite over the data connection using the first steerable antenna and the second steerable antenna, wherein the transfer switch is configurable to receive global positioning system ("GPS") data from at least each of an external GPS unit, the first antenna control unit, and the second antenna control unit, and wherein the transfer switch is configured to buffer the global positioning system ("GPS") data to the at least one modem.

2. A system comprising:

a first steerable antenna;

a first antenna control unit operably coupled to the first steerable antenna;

a second steerable antenna;

a second antenna control unit operably coupled to the second steerable antenna, wherein the first steerable antenna is configured to provide a data connection at a first point in time;

a transfer switch operably coupled to the first antenna control unit, the first steerable antenna, the second antenna control unit, and the second steerable antenna, the transfer switch configured to transfer the data connection from the first steerable antenna to the second steerable antenna at a second point in time, in response to a change in satellite visibility based on the first steerable antenna at least one of (i) entering a preprogrammed blockage zone and (ii) an unexpected loss of satellite visibility; and at least one modem operably coupled to the transfer switch for transmitting and receiving data with a satellite over the data connection using the first steerable antenna and the second steerable antenna, wherein the transfer switch is configured to provide a modem receive-lock signal used to retarget a line of sight to the satellite in response to an antenna drift to one or both of the first antenna control unit and the second antenna control unit.

3. A system comprising:

a first steerable antenna;

a first antenna control unit operably coupled to the first steerable antenna;

a second steerable antenna;

a second antenna control unit operably coupled to the second steerable antenna, wherein the first steerable antenna is configured to provide a data connection at a first point in time;

a transfer switch operably coupled to the first antenna control unit, the first steerable antenna, the second antenna control unit, and the second steerable antenna, the transfer switch configured to transfer the data connection from the first steerable antenna to the second steerable antenna at a second point in time, in response to a change in satellite visibility based on the first steerable antenna at least one of (i) entering a preprogrammed blockage zone and (ii) an unexpected loss of satellite visibility; and at least one modem operably coupled to the transfer switch for transmitting and receiving data with a satellite over the data connection using the first steerable antenna and the second steerable antenna, wherein the transfer switch is configured to transfer the data connection between the first steerable antenna and the second steerable antenna in response to a determined satellite visibility value based on at least one of a signal reception quality and a modem receive-lock status.

4. A method comprising:

receiving global positioning system ("GPS") data from at least one of an external GPS unit, a first antenna control unit, and a second antenna control unit;

buffering the global positioning system ("GPS") data to at least one modem;

providing a modem receive-lock signal used to retarget a line of sight in response to an antenna drift of one or both of the first antenna control unit and the second antenna control unit;

determining a satellite visibility value of a first steerable antenna and a second steerable antenna based on at least one of a signal reception quality and a modem receive-lock status;

transferring a connection between the first steerable antenna and the second steerable antenna in response to a determined satellite visibility value;

determining a first uplink transmission power level of the first steerable antenna and a second uplink transmission power level of the second steerable antenna; and setting an attenuation level for one of the first steerable antenna and the second steerable antenna and the in response to a difference in the first uplink transmission power level and the second uplink transmission power level, wherein a higher of the first uplink transmission power level and the second uplink transmission power level is attenuated to be balanced with a lower of the first uplink transmission power level and the second uplink transmission power level.

5. The method of claim 4, wherein the global positioning system ("GPS") data is received only from the external GPS unit.

6. An apparatus comprising:

a first radio frequency coupling to a first steerable antenna;

a first control coupling to a first antenna control unit operably coupled to the first steerable antenna;

a second radio frequency coupling to a second steerable antenna;

a second control coupling to a second antenna control unit operably coupled to the second steerable antenna, wherein the first steerable antenna is configured to provide a data connection at a first point in time;

at least one modem coupling for transmitting and receiving data over the data connection between the at least one modem and a satellite using the first steerable antenna and the second steerable antenna; and a transfer switch that is configurable to receive global positioning system ("GPS") data from at least an external GPS unit, the first antenna control unit, and the second antenna control unit, wherein the transfer switch is configured to buffer the global positioning system ("GPS") data to the at least one modem.

7. An apparatus comprising:

a first radio frequency coupling to a first steerable antenna;

a first control coupling to a first antenna control unit operably coupled to the first steerable antenna;

a second radio frequency coupling to second steerable antenna;

a second control coupling to second antenna control unit operably coupled to the second steerable antenna, wherein the first steerable antenna is configured to provide a data connection at a first point in time;

at least one modem coupling for transmitting and receiving data over the data connection between the at least one modem and a satellite using the first steerable antenna and the second steerable antenna; and a transfer switch processor configured to provide a modem receive-lock signal used to retarget a line of sight in response to an antenna drift to one or both of the first antenna control unit and the second antenna control unit.

8. An apparatus comprising:

a first radio frequency coupling to a first steerable antenna;

a first control coupling to a first antenna control unit operably coupled to the first steerable antenna;

a second radio frequency coupling to second steerable antenna;

a second control coupling to second antenna control unit operably coupled to the second steerable antenna, wherein the first steerable antenna is configured to provide a data connection at a first point in time;

at least one modem coupling for transmitting and receiving data over the data connection between the at least one modem and a satellite using the first steerable antenna and the second steerable antenna; and a transfer switch processor configured to transfer the data connection between the first steerable antenna and the second steerable antenna in response to a determined satellite visibility value based on at least one of a signal reception quality and a modem receive-lock status.

9. An apparatus comprising:

a first radio frequency coupling to a first steerable antenna;

a first control coupling to a first antenna control unit operably coupled to the first steerable antenna;

a second radio frequency coupling to second steerable antenna;

a second control coupling to second antenna control unit operably coupled to the second steerable antenna, wherein the first steerable antenna is configured to provide a data connection at a first point in time;

at least one modem coupling for transmitting and receiving data over the data connection between the at least one modem and a satellite using the first steerable antenna and the second steerable antenna; and a transfer switch processor configured to:

determine a first uplink transmission power level of the first steerable antenna and a second uplink transmission power level of the second steerable antenna; and set an attenuation level for one of the first steerable antenna and the second steerable antenna and the in response to a difference in the first uplink transmission power level and the second uplink transmission power level, wherein a higher of the first uplink transmission power level and the second uplink transmission power level is attenuated to be balanced with a lower of the first uplink transmission power level and the second uplink transmission power level.

10. A system comprising:

a first steerable antenna;

a first antenna control unit operably coupled to the first steerable antenna;

a second steerable antenna;

a second antenna control unit operably coupled to the second steerable antenna, wherein the first steerable antenna is configured to provide a data connection at a first point in time;

a transfer switch operably coupled to the first antenna control unit, the first steerable antenna, the second antenna control unit, and the second steerable antenna, the transfer switch configured to transfer the data connection from the first steerable antenna to the second steerable antenna at a second point in time, in response to a change in target antenna visibility based on the first steerable antenna entering a preprogrammed zone; and at least one modem operably coupled to the transfer switch for transmitting and receiving data with a target antenna over the data connection using the first steerable antenna and the second steerable antenna, wherein the transfer switch is configurable to receive global positioning system ("GPS") data from at least each of an external GPS unit, the first antenna control unit, and the second antenna control unit, and wherein the transfer switch is configured to buffer the global positioning system ("GPS") data to the at least one modem.

11. A system comprising:

a first steerable antenna;

a first antenna control unit operably coupled to the first steerable antenna;

a second steerable antenna;

a second antenna control unit operably coupled to the second steerable antenna, wherein the first steerable antenna is configured to provide a data connection at a first point in time;

a transfer switch operably coupled to the first antenna control unit, the first steerable antenna, the second antenna control unit, and the second steerable antenna, the transfer switch configured to transfer the data connection from the first steerable antenna to the second steerable antenna at a second point in time, in response to a change in target antenna visibility based on the first steerable antenna entering a preprogrammed zone; and at least one modem operably coupled to the transfer switch for transmitting and receiving data with a target antenna over the data connection using the first steerable antenna and the second steerable antenna, wherein the transfer switch is configured to provide a modem receive-lock signal used to retarget a line of sight to the target antenna in response to an antenna drift to one or both of the first antenna control unit and the second antenna control unit.

12. A system comprising:

a first steerable antenna;

a first antenna control unit operably coupled to the first steerable antenna;

a second steerable antenna;

a second antenna control unit operably coupled to the second steerable antenna, wherein the first steerable antenna is configured to provide a data connection at a first point in time;

a transfer switch operably coupled to the first antenna control unit, the first steerable antenna, the second antenna control unit, and the second steerable antenna, the transfer switch configured to transfer the data connection from the first steerable antenna to the second steerable antenna at a second point in time, in response to a change in target antenna visibility based on the first steerable antenna entering a preprogrammed zone; and at least one modem operably coupled to the transfer switch for transmitting and receiving data with a target antenna over the data connection using the first steerable antenna and the second steerable antenna, wherein the transfer switch is configured to transfer the data connection between the first steerable antenna and the second steerable antenna in response to a determined target antenna visibility value based on at least one of a signal reception quality and a modem receive-lock status.

13. An apparatus comprising:

a first radio frequency coupling to a first steerable antenna;

a first control coupling to a first antenna control unit operably coupled to the first steerable antenna;

a second radio frequency coupling to a second steerable antenna;

a second control coupling to a second antenna control unit operably coupled to the second steerable antenna, wherein the first steerable antenna is configured to provide a data connection at a first point in time;

at least one modem coupling for transmitting and receiving data over the data connection between the at least one modem and a target antenna using the first steerable antenna and the second steerable antenna; and a transfer switch that is configurable to receive global positioning system ("GPS") data from at least an external GPS unit, the first antenna control unit, and the second antenna control unit, wherein the transfer switch is configured to buffer the global positioning system ("GPS") data to the at least one modem.

* * * * *